United States Patent [19]

Sasaki et al.

[11] Patent Number: 5,304,899
[45] Date of Patent: Apr. 19, 1994

[54] ENERGY SUPPLY SYSTEM TO ROBOT WITHIN PIPE

[75] Inventors: Kunihiko Sasaki, Chiryu; Masao Kodera; Tadashi Hattori, both of Okazaki, all of Japan

[73] Assignee: Nippondenso Co., Ltd., Kariya, Japan

[21] Appl. No.: 936,385

[22] Filed: Aug. 28, 1992

[30] Foreign Application Priority Data

Aug. 30, 1991 [JP] Japan .................. 3-220179

[51] Int. Cl.[5] .............................. H02J 17/00
[52] U.S. Cl. ........................ 318/16; 378/60; 318/568.12
[58] Field of Search ............ 378/60; 340/870.28, 340/854.6, 855.8, 636; 104/138; 358/100; 346/33 P; 475/332, 334; 105/365; 333/249, 239, 248; 318/16, 568.12

[56] References Cited

U.S. PATENT DOCUMENTS

| | | | |
|---|---|---|---|
| 2,786,972 | 3/1957 | Dreider et al. | 318/16 |
| 3,214,690 | 10/1965 | Salisbury | 318/16 |
| 4,006,359 | 2/1977 | Sullins et al. | 340/60 |
| 4,057,781 | 11/1977 | Scherbatskoy | 340/18 LD |
| 4,283,628 | 8/1981 | Kulekov et al. | 378/60 |
| 4,795,993 | 1/1989 | Park et al. | 333/249 |
| 4,837,556 | 6/1989 | Matsushita et al. | 340/310 R |
| 4,839,644 | 6/1989 | Safinya et al. | 340/854 |
| 4,904,996 | 2/1990 | Fernandes | 340/870.07 |
| 4,973,924 | 11/1990 | Bergero et al. | 333/21 R |
| 5,001,444 | 3/1991 | Salvan et al. | 333/21 A |
| 5,043,683 | 8/1991 | Howard | 333/21 A |

*Primary Examiner*—William M. Shoop, Jr.
*Assistant Examiner*—Brian Sircus
*Attorney, Agent, or Firm*—Cushman, Darby & Cushman

[57] ABSTRACT

A system for supplying energy to a microrobot disposed within a piping system for inspection or repair. The system comprises a microwave transmission section for transmitting as energy a microwave to the robot within the piping system. The microwave transmission section is arranged to transmit the microwave having a frequency equal to or higher than a frequency determined in correspondence with an inner diameter of a pipe of the piping system in which the microrobot is disposed. The microrobot receives the transmitted microwave to convert it into an electric power for operation. This arrangement can ensure a smooth operation of the microrobot within a small-sized pipe because the microrobot is not connected to the transmission section through an electric connection.

13 Claims, 10 Drawing Sheets

ENERGY SUPPLY SYSTEM TO ROBOT WITHIN PIPE

BACKGROUND OF THE INVENTION

The present invention relates generally to an energy supply system to an object within a pipe, and more particularly to an energy supply system which supplies energy, using a microwave, to a microrobot disposed in a metallic pipe of a heat exchanger or the like that performs operations such as an inspection and repair.

For inspection and repair of a metallic pipe, particularly, a pipe having a small inner diameter (for example, about several millimeters), a microrobot is required for inspection and repair without disassembly. An important problem arising in the realization of such a microrobot relates to the supply of energy for driving the microrobot. That is, since a general wireless energy supply is effected by means of the electromagnetic induction (low frequency), the transmission distance of the energy is limited to some degree (several centimeters) and hence, according to the method of connection between pipes, it is difficult to drive a microrobot when the moving distance from the microwave generating source is beyond several meters. Further, according to a method of coupling the energy generating source through an electric connection to the microrobot, the microrobot is arranged to have a size which allows the movement within a pipe having a diameter of about several millimeters to perform the inspection, repair and the like. On the other hand, in this case, there is a problem that the electric connection is an obstacle to the movement of the microrobot.

SUMMARY OF THE INVENTION

It is therefore an object of the present invention to provide an energy supply system which is capable of surely supplying energy to a robot without obstructing the operation of the robot disposed within a pipe.

According to this invention, an energy supply system for supplying energy to a microrobot within a piping system made of a conductive material, comprises transmission means for transmitting microwaves to the microrobot within the piping system. The transmission means generates the microwaves having a frequency equal to or higher than a frequency determined in correspondence with the inner diameter of a pipe of the piping system in which the microrobot moves and operates. The microrobot includes converting means for receiving the microwaves from the transmission means and converting the microwaves into an electric power. The microrobot moves and operates by the converted electric power. The microwave to be transmitted by the transmission means takes a transmission mode wherein electromagnetic energy distribution within a surface perpendicular to an axis of a pipe of the piping system and in a circumferential direction of the pipe is uniform.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
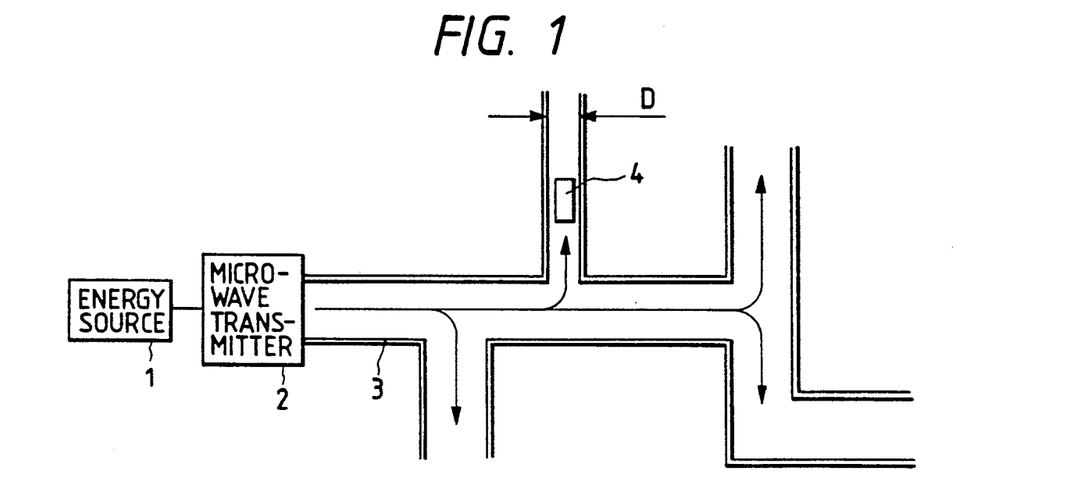
FIG. 1 is a block diagram showing a basic arrangement of an energy supply system according to this invention.

Embodiments of this invention will be described with reference to the drawings. The description will be made in terms of a system in which one microrobot moves and operates within a piping system comprising a plurality of pipes having different inner diameters which are connected to each other. FIG. 1 shows the entire arrangement of this invention. In FIG. 1, designated at numeral 3 is a metallic piping system comprising a plurality of pipes having given diameters (about several millimeters) and given inner diameters (the minimum inner diameter: D), a microrobot 4 operating within the piping system 3. Further, denoted at numeral 1 is a microwave energy source for supplying or transmitting a microwave (generally, its frequency is 3 GHz to 300 GHz) into the pipe 3 in which the microrobot operates. For example, when the microrobot 4 is disposed within the pipe having the minimum inner diameter D, with the frequency $f=f_D$ (which is a frequency higher than a frequency $f_{SD}$ obtained in accordance with a cut-off frequency characteristic which will be described hereinafter) which allows the transmission under the condition of the minimum inner diameter D, a microwave signal is outputted to a microwave transmitter 2 whereby a microwave with the frequency $f_D$ generates so as to permit a small-loss transmission of the microwave.

The microwave transmitter 2 is arranged to generate a microwave having a frequency f corresponding to the inner diameter of the pipe in which the microrobot is disposed. Here, since the metallic piping system 3 can be used as an ideal transmission line, it is possible to effectively transmit microwaves. The microwave energy source 1 and the microwave transmitter 2 correspond to a transmission means. The microrobot 4 receives the microwave transmitted (introduced) into the pipe 3 and converts it into an actuator-driving electric energy and operate by the converted electric energy.

Figure 15:
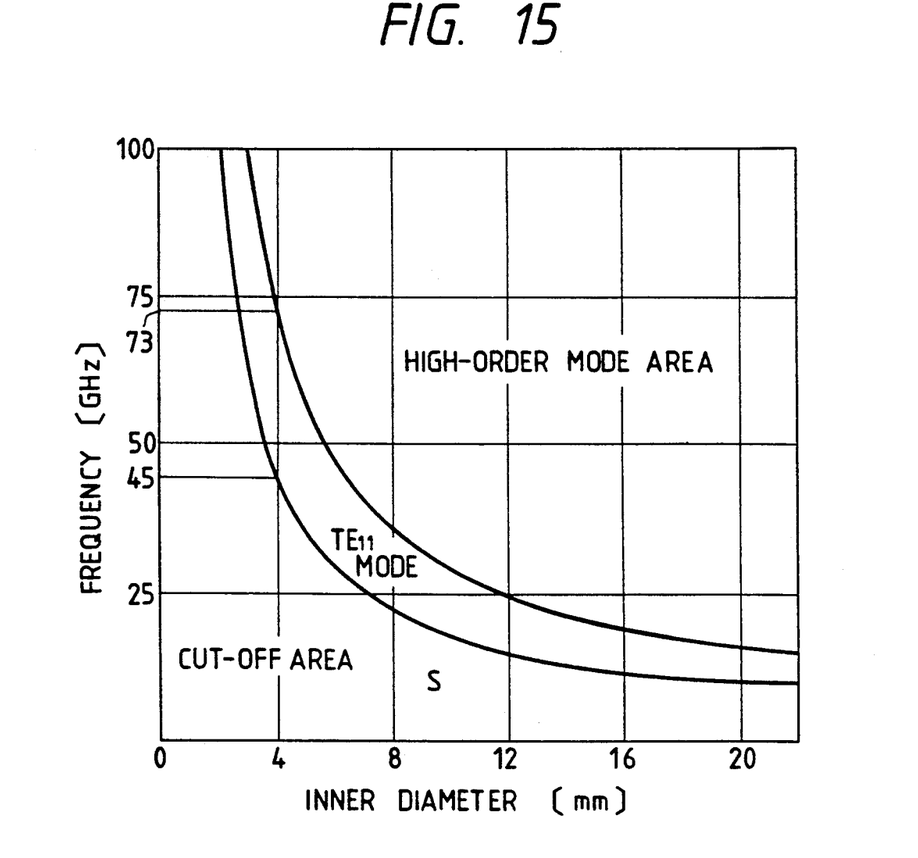
FIG. 15 is a graphic diagram showing the pipe inner diameter-frequency characteristic curve in the case of transmitting a microwave in the $TE_{11}$ mode.

A description will be made in terms of the relation between the pipe inner diameter and the frequency of the microwave. FIG. 15 shows a pipe inner diameter-frequency characteristic curve in the case that the microwave is transmitted in accordance with $TE_{11}$ mode. That is, the relation between the pipe inner diameter and the transmission frequency of an electric wave is as illustrated in FIG. 15. FIG. 15 illustrates a $TE_{11}$ mode area and a high-order mode area with cut-off frequency characteristic curves S being border lines. For example, in the case that the pipe inner diameter is 4 mm, the cut-off frequency becomes $f_{S4}=45$ GHz, and when transmitting an electric wave such as a microwave to the inside of the pipe having of an inner diameter of 4 mm, the oscillation frequency $f_4$ of the electric wave is arranged to be higher than 45 GHz. Here, the frequency on the cut-off frequency characteristic curve S in the case of a pipe inner diameter of Z is expressed to be $f_{SZ}$ and a frequency higher than the frequency $f_{SZ}$ is expressed as $f_Z$.

Further, in the case of transmitting an electric wave at a small loss, it is preferable to take a frequency which is not in the high-order mode area. For example, in the case that the pipe inner diameter is 4 mm, a small-loss transmission can be made if the oscillation frequency of the electric wave is arranged to be 45 GHz$<f<$73 GHz.

A detailed description will be made hereinbelow in terms of portions of each of systems having the aforementioned entire arrangement according to embodiments of this invention. Here, in the embodiments, the corresponding parts are marked with the same numerals and the frequency f based on the pipe inner diameter and the cut-off frequency characteristic curve is a frequency of the microwave.

Figure 2:
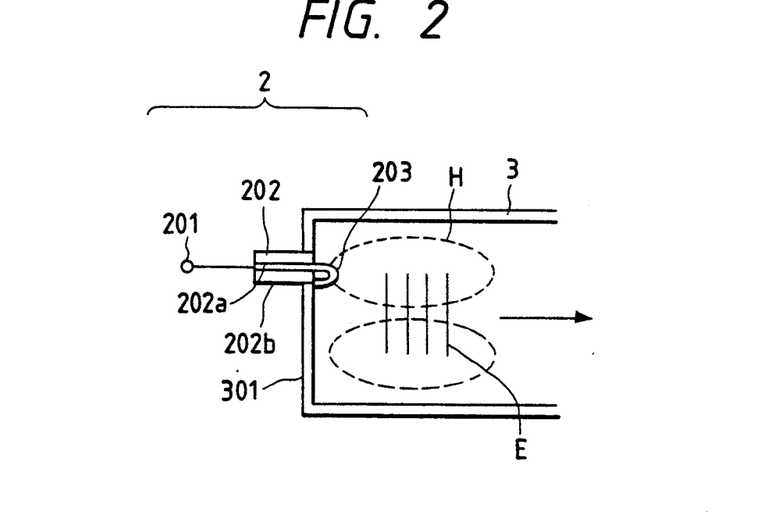
FIG. 2 is a cross-sectional view showing an arrangement of an microwave transmitter of an energy supply system according to a first embodiment of this invention.

First, a description will be made with reference to FIG. 2 in terms of an arrangement of the microwave transmitter 2 of the system according to a first embodiment of this invention. In FIG. 2, an input terminal 201 is for receiving a microwave signal from the microwave energy source 1 and is coupled to a coaxial connector 202. A loop conductor 203 has a loop configuration constructed with a wire member, and one terminal thereof is connected to a central conductor 202a of the coaxial connector 202 and the other terminal thereof is connected to an external conductor 202b, i.e., the earth. Further, with a microwave current flowing through the loop conductor 203, lines of magnetic force penetrating the loop and perpendicular to the loop surfacer are generated and lines of electric force E occurs whereby the microwave is transmitted into the piping system 3. Further, a reflection place 301 is an electromagnetic wave reflector provided at an end portion of the piping system 3 for fixing the coaxial connector 202 and the loop conductor 203 and reflects the microwave introduced into the piping system 3 so as to form a boundary condition with respect to the lines of magnetic force to thereby effectively transmit the microwave.

Figure 3:
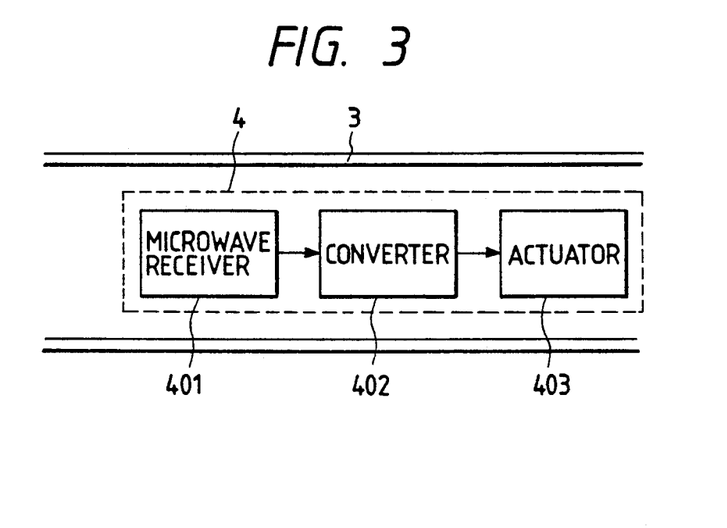
FIG. 3 is a block diagram showing an arrangement of a microrobot of an energy supply system according to the first embodiment.
Figure 4:
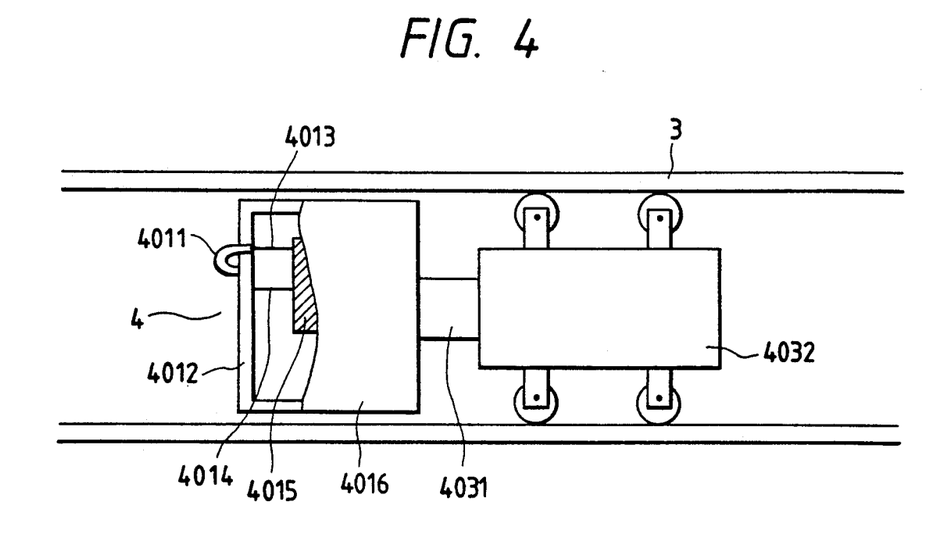
FIG. 4 is an illustration of a detailed arrangement of the microrobot in the first embodiment.

Subsequently, a description will be made with reference to FIG. 3 in terms of an arrangement of the microrobot 4. In FIG. 3, the microrobot 4 comprises a microwave receiver 401 for principally receiving the microwave transmitted in the piping system 3, a converter 402 for converting the received microwave into an electric energy, and an actuator 403 (driving means) for operating the microrobot 4 by using the converted electric energy. Here, the microwave receiver 401 and the converter 402 correspond to a converting means. The detailed arrangement of the microrobot 4 is as illustrated in FIG. 4. In FIG. 4, a loop conductor 4011 has the same structure as the loop conductor 203 (FIG. 2) constituting the above-mentioned microwave transmitter 2 and perpendicularly receives the lines of magnetic force of the microwave transmitted from the microwave transmitter 2 due to the reversibility of the electric wave. A reflecting plate 4012 is an electric wave reflector arranged at an end surface of a housing 4016, which will be described hereinafter, and reflects the microwave transmitted into the piping system 3 so as to form a boundary condition with respect to the lines of magnetic force H, thereby allowing the reception of the microwave at a high efficiency. Here, this reflecting plate 4012 is electrically connected to the ground at the inside of the microrobot 4.

A signal line 4013 is at its one end connected to the non-grounded side of the loop conductor 4011 and a signal line is at its one end connected to the grounded side of the loop conductor 4011. The other ends of the signal lines 4013 and 4014 are connected to a circuit board 4015. The circuit board 4015 inputs, through the signal lines 4013 and 4014, the microwave energy received by the loop conductor 4011 and converts it into electric energy for driving an actuator 4032.

The housing 4016 is for keeping the above-mentioned loop conductor 4011, reflecting plate 4012, circuit board 4015 and others. A connecting portion 4031 is a member for connecting the actuator 4032 to the housing 4032. Here, in the inside of the connecting portion 4031 there is a signal line, not shown, which supplies electric energy from the circuit board 4016 to the actuator 4032. Further, the actuator 4032 receives the electric energy to move the microrobot 4 or cause the microrobot to perform a predetermined operation.

Secondly, operation will be described hereinbelow. In FIGS. 1 to 4, the microwave energy source 1 outputs to the microwave transmitter 2 a microwave signal having a frequency $f_D$ whereby the transmission to the pipe which has an inner diameter of D and in which the microrobot operates can be allowed. The microwave transmitter 2 inputs the microwave signal through its input terminal 201 and supplies a microwave current to the loop conductor 203 so as to generate the microwave with the frequency $F_D$ in a direction indicated by arrows in FIGS. 1 and 2. Thus, the loop conductor 4011 of the microrobot 4 receives this microwave to input the reception signal through the signal lines 4013 and 4014 to the circuit board 4015. In the circuit board 4015, the inputted reception signal is converted into energy (electric energy) for driving the actuator 4032 and then supplied through the connecting portion 4031 to the actuator 4032. In response to the energy supply, the microrobot 4 operates or moves.

As described above, the micro-robot performs inspection and repair of the inside of the piping system 3 in which pipes having different inner diameters are connected to each other. The energy supply to the microrobot 4 can be achieved without using a signal line. In addition, the frequency of the microwave to be transmitted is arranged to be equal to (or higher than) a frequency corresponding to the inner diameter of the pipe in which the microrobot is disposed, whereby it is possible to adequately supply the energy.

A description will be made hereinbelow in terms of one example of a transmission method to appropriately perform the transmission of the microwave generated by the microwave transmitter 2. Here, the description will be made in terms of the case that the microwave is transmitted in accordance with the $TE_{ox}$ (Transverse Electric) mode or $TM_{ox}$ (Transverse Magnetic) mode. In the expression of $TE_{0x}$ and $TM_{0x}$, "0" indicates that the wave number in the circumferential direction of the pipe is 0 and "X" indicates that the wave number in the axial direction (radial direction) of the pipe is X (X is a positive integer).

Figure 5A:
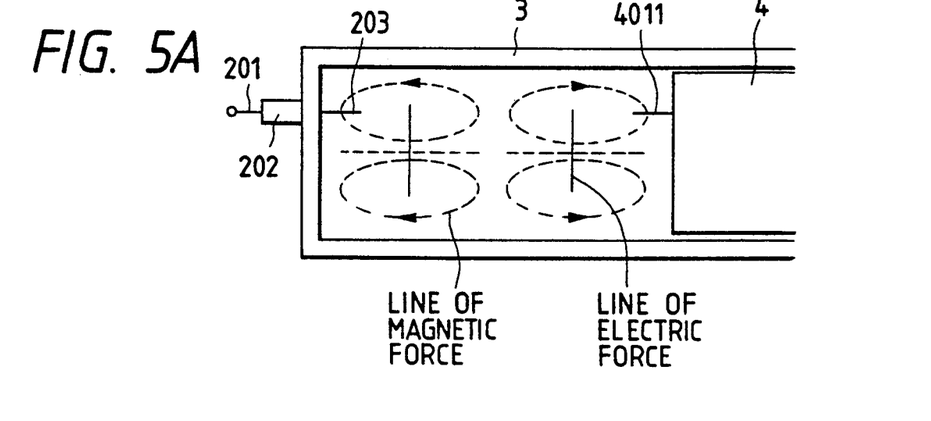
FIGS. 5A to 5C are illustrations for describing a generating state of a microwave in the first embodiment.
Figure 5B:
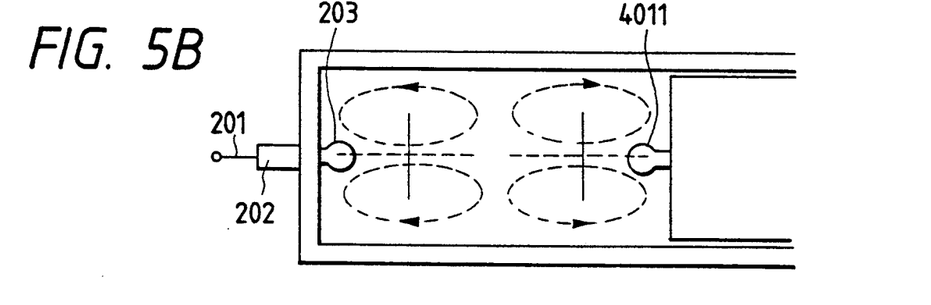
Figure 5C:
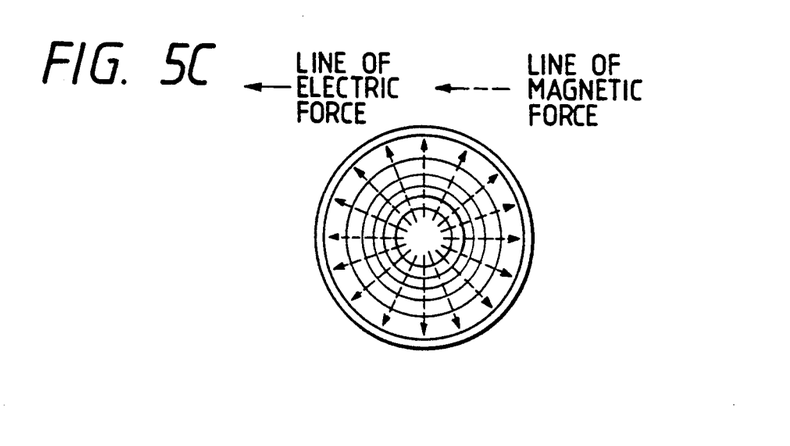

FIGS. 5A to 5C are illustrations for describing the generating state of the microwave in the case of the transmission according to the $TE_{0x}$ mode: FIG. 5A is a cross-sectional illustration viewed from the side of the pipe 3, FIG. 5B is a cross-sectional illustration viewed from the top of the pipe 3, and FIG. 5C is a cross-section illustration viewed from the axial direction. In FIGS. 5A to 5C, in the case of the transmission according to the $TE_{01}$ mode, the disposing position of the loop conductor 203 is on the concentric circle which is $\frac{1}{2}$ of the pipe inner diameter and the loop surface is disposed at a position parallel to the direction of the tangential line to the circumference. Further, the loop conductor connected to the coaxial connector 202 transmits a microwave having a predetermined frequency (which is equal to or higher than the frequency corresponding to the inner diameter of the pipe in which the microrobot 4 is disposed) to the loop conductor 4011 of the microrobot 4 in accordance with the microwave signal from the input terminal 201. Here, in the illustrations, dotted lines indicate the lines of magnetic force of the microwave transmitted and solid lines indicate the lines of electric force thereof.

As shown in FIG. 5C, the microwave in the $TE_{0x}$ mode is transmitted to make the mode in which the electromagnetic energy distribution in the circumferential direction of the pipe 3 uniform. Here, in detail, the microwave illustrated in FIG. 5C is transmitted in the $TE_{01}$ mode. The microwave transmitted in such a mode allows an adequate propagation as described below. That is, generally the piping system 3 is curved and bent at a number of portions, and the microrobot 4 moving within the piping system 3 frequently rotates within a surface perpendicular to the pipe axis when working. Accordingly, an angular difference between the microwave transmission loop conductor 203 and the microwave reception loop conductor 4011 occurs within the surface perpendicular to the pipe axis. As a result, when the angular difference occurs until the loop surfaces thereof become perpendicular to the axial direction, the loss of the microwave energy reaches 20 dB whereby it becomes difficult to always receive the microwave. Thus, by selecting a mode such as the $TE_{01}$ mode in which the electromagnetic energy distribution in the circumferential direction of the pipe is uniform, it becomes possible to always receive a constant microwave irrespective of the rotation of the microrobot 4 in the circumferential direction.

Figure 14:
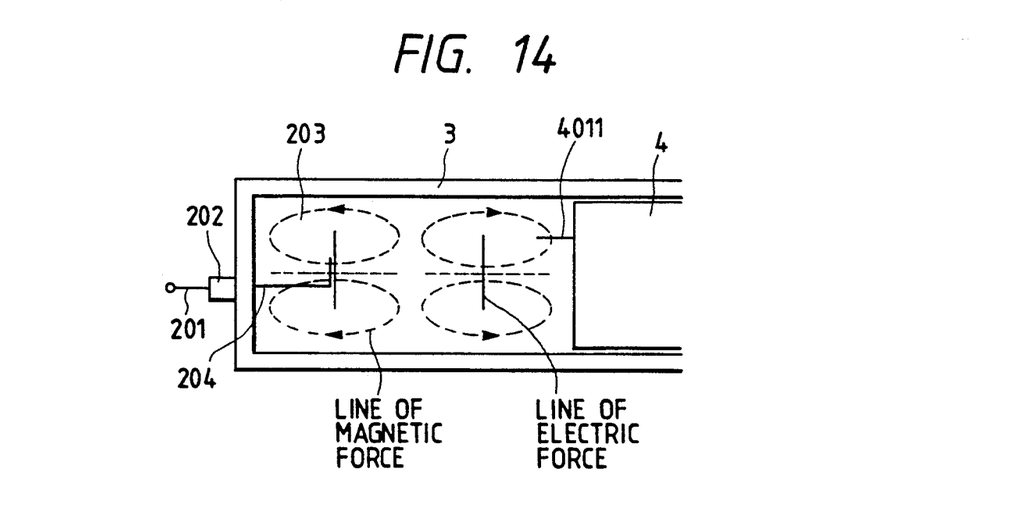
FIG. 14 is an illustration for describing generating state of a microwave in the case of performing the microwave transmission in the $TE_{01}$ mode.

Here, although the $TE_{01}$ mode is selected, the $TM_{01}$ mode can provide a similar effect. In addition, of the TE or TM modes, a mode in which the first coefficient is 0 (that is, the wave number in the circumferential direction is 0) can also offer a similar effect. Moreover, although the microwave is transmitted by the coupling of the lines of magnetic force due to the loop conductor 4011 and the loop conductor 203 disposed at a predetermined positions, it is also appropriate to, as illustrated in FIG. 14, use a bar-like conductor 204 disposed at a position to allow the coupling to the lines of electric force.

Figure 6A:
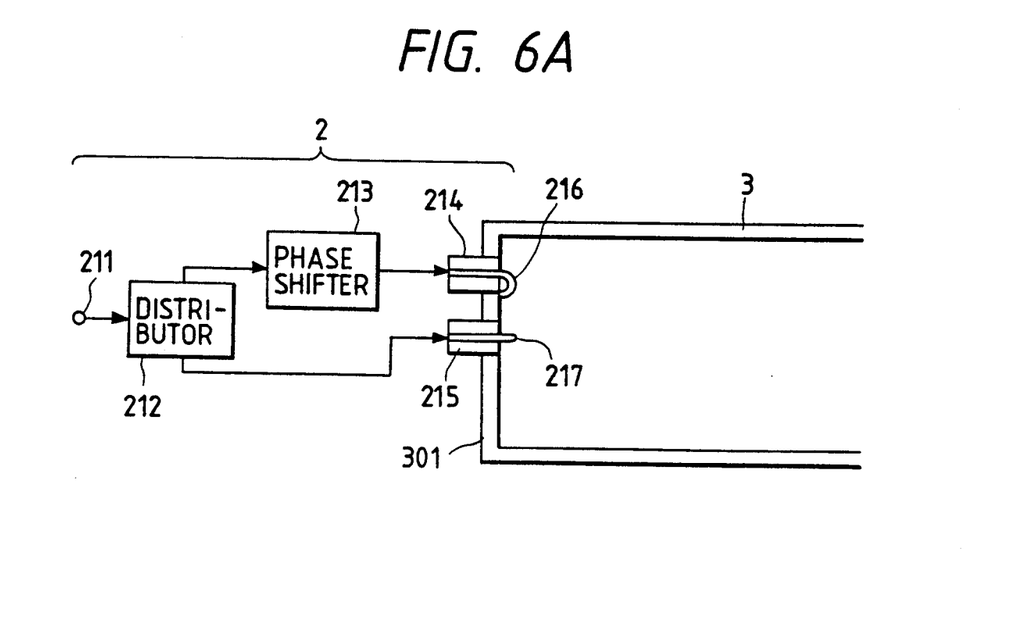
FIGS. 6A and 6B show an arrangement of a microwave transmitter of an energy supply system according to a second embodiment of this invention.
Figure 6B:
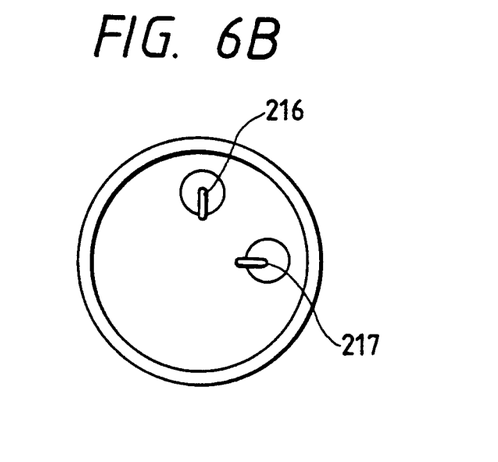

Further, a description will be made in terms of a second embodiment of this invention. This second embodiment relates to a system in which the microwave is transmitted as a circular polarization. FIG. 6A shows a detailed arrangement of a microwave transmitter 2 according to the second embodiment and FIG. 6B is a cross-sectional illustration viewed from the pipe axis direction. In FIG. 6A, an electric power distributor 212 inputs a microwave signal through an input terminal 211 so as to distribute electric power to two outputs (a phase shifter 213 and a second coaxial connector 215) at the same phase and same rate. The second coaxial connector 215 is responsive to one output of the electric power distributor 212 which supplies a microwave current to a second loop conductor 217. As shown in FIG. 6B, the second loop conductor 217 is disposed at a position shifted by 90° in the circumferential direction with respect to a loop conductor 216 which will be described hereinafter. Further, the phase shifter 213 is responsive to the other output of the electric power distributor 212 which delays the phase of the inputted microwave by an electric angle of 90° and supplies the delayed microwave signal to a first coaxial connector 214 to supply a microwave current to the second loop conductor 216.

Subsequently, an arrangement of the microrobot will be described hereinbelow. The arrangement of the microrobot in the second embodiment is basically similar to that of the microrobot 4 in the above-described first embodiment. Due to the electric wave reversibility in the transmission and reception of the circular polarization, for receiving the circular polarization microwave, the loop conductor 4011 used in the first embodiment is disposed at a positioned shifted by 90° in the circumferential direction as well as the first and second loop conductors 216 and 217 illustrated in FIGS. 6A and 6B. The detailed description of the arrangement and operation thereof will be omitted for brevity.

Secondly, operation of the system thus arranged will be described hereinbelow. In FIG. 6A, in response to input of the microwave signal to the input terminal 211, the electric power distributor 212 equally distributes the electric power of the microwave signal to output them to the phase shifter 213 and the second coaxial connector 215. Further, in response to one of the microwave signals equally distributed by the electric power distributor 212, the second coaxial connector 215 supplies a microwave current to the second loop conductor 217. On the other hand, the phase shifter 213 delays the other microwave signal, equally distributed by the electric power distributor 212, by an electric angle of 90° and then supplies the delayed microwave signal to the first coaxial connector 214 to cause the microwave current to flow through the first loop conductor 216. With the microwave currents being respectively supplied to the first and second loop conductors 216 and 217 disposed to be shifted by 90° in the circumferential direction as illustrated in FIG. 6B, the microwave propagating within the piping system 3 becomes a circular polarization.

Since in this circular polarization the electromagnetic field rotates at the frequency of the microwave and the electromagnetic field energy distribution in the circumferential direction becomes uniform, it is possible to always receive the constant microwave irrespective of the mode of the microwave propagating within the piping system 3 and the rotation of the microrobot 4 in the circumferential direction. Here, although the loop conductors are described as a means to generate a circular polarization microwave, it is also appropriate to use bar-like conductors which are disposed at positions shifted by 90° from each other in the circumferential direction and which are coupled to the lines of electric force.

Moreover, a description will be made in terms of a method of usefully controlling the operation of the microrobot when using the above-described circular polarization microwave.

(A) Operation Control of Microrobot due to Data Transmission

Figure 7:
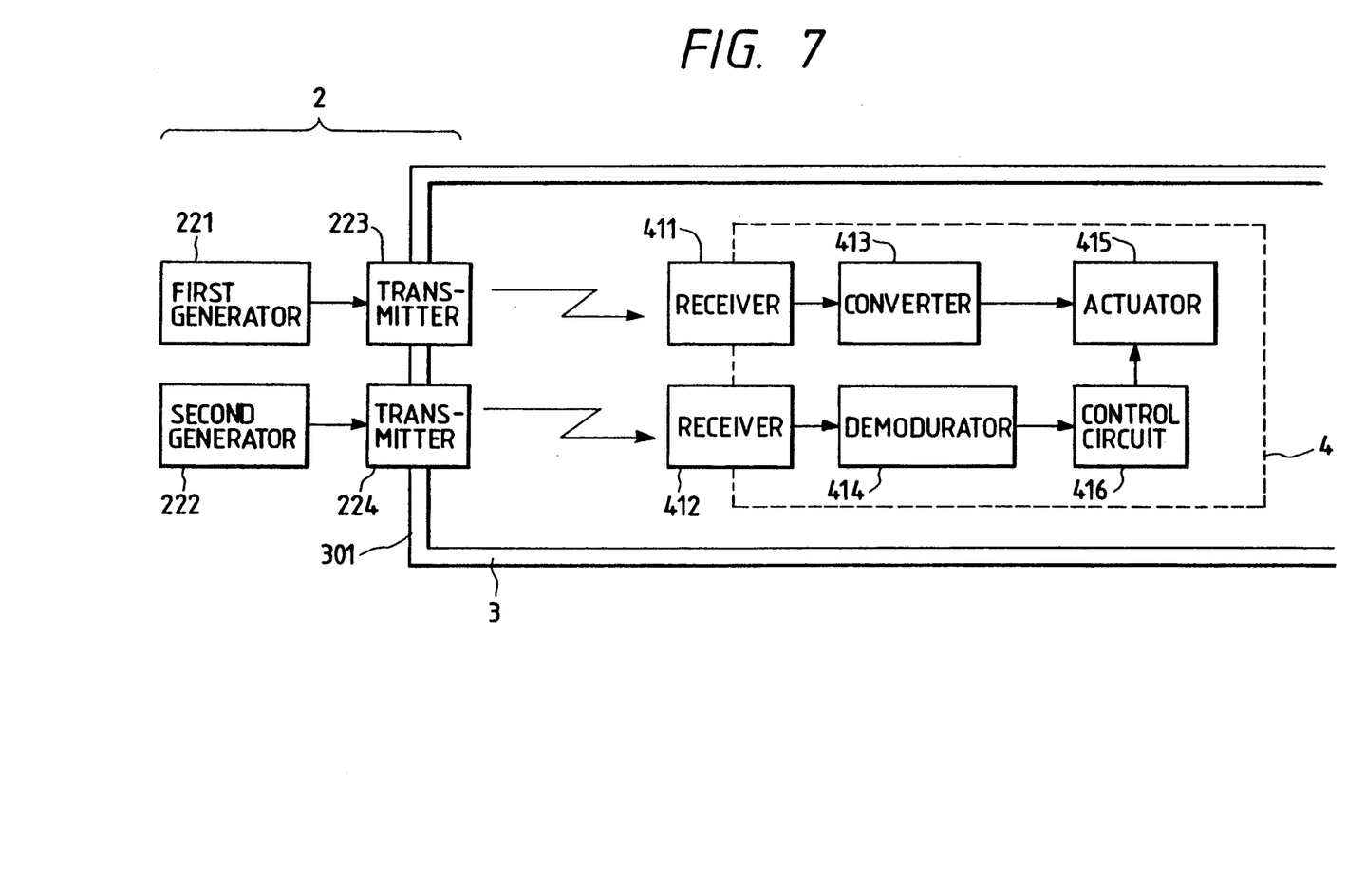
FIG. 7 shows detailed arrangements of a microwave transmitter and a microrobot in the second embodiment in the case of using a circular polarization microwave.

Here, a description will be made in terms of the case of independently generating a first microwave to be used as the driving energy by the microwave transmitter and a second microwave to be used for transmitting control data to control the operation of the microrobot. FIG. 7 shows arrangements of the microwave transmitter 2 and the microrobot 4. In FIG. 7, a first microwave generator 221 outputs a first microwave signal so as to generate a microwave which produces energy for driving an actuator 415 of a microrobot 4. A right hand circular polarization transmitter 223 inputs the first microwave signal from the first microwave generator 221 so as to generate a right hand circular polarization microwave within the piping system 3. Further, a second microwave generator 222 outputs a second microwave signal modulated on the basis of the control data of the microrobot, for example, digital data or the like for controlling the driving state of the actuator 415 of the microrobot 4. A left hand circular polarization transmitter 224 inputs the second microwave from the second microwave transmitter 222 so as to generate a left hand circular polarization microwave within the piping system 3. A right hand circular polarization receiver 411 provided in the microrobot 4 receives only the right hand circular polarization microwave to output a reception signal and a converter 413 converts the reception signal into electric energy for driving the actuator 415 and outputs the electric energy to the actuator 415.

On the other hand, a left hand circular polarization microwave receiver 412 provided in the microrobot 4 receives only the left hand circular polarization microwave to output a reception signal and a demodulator 414 demodulates the reception signal i.e., the modulated digital data. A control circuit 416 controls the operation of the actuator 415 on the basis of the demodulated digital data in accordance with a predetermined program.

In operation, in FIG. 7, for example, when moving the microrobot 4 from the present position to a different position in the same pipe, the right hand circular polarization microwave is generated within the piping system 3 by means of the first microwave generator 221 and the right hand circular polarization microwave transmitter 223 and modulated in accordance with the moving data to a desired position by means of the second microwave generator 222 and the left hand circular polarization transmitter 224 so as to generate the left hand circular polarization microwave within the piping system 3. Accordingly, in response to the reception of the right hand circular polarization microwave, the right hand circular polarization receiver 411 supplies the driving energy through the converter 413 to the actuator 415, and in response to the reception of the left hand circular polarization microwave by the left hand circular polarization receiver 412, the demodulator 414 demodulates the operation control digital data and the control circuit 416 controls the operation of the actuator 415.

Although the circular polarization of the microwave consists of right hand circular polarization and the left hand circular polarization, these polarizations have the nature to independently propagate in a linear space such as the piping system 3 and hence two systems, i.e., the microwaves having predetermined frequencies corresponding to the inner diameters of the piping system 3 can simultaneously be transmitted through the same transmission passage. That is, with the driving energy for the actuator of the microrobot being supplied using the right hand circular polarization microwave and the control data for the control of the actuator being transmitted using the left hand circular polarization microwave as illustrated in FIG. 7, it is possible to remote-control the operation of the microrobot.

Here, although in this embodiment the right hand circular polarization is used for the energy supply and the left hand circular polarization is used for the data communication, it is possible that the left hand circular polarization is used for the energy supply and the right hand circular polarization is used for the data communication. In addition, although the data transmitted is used as the control data for the actuator, it is also appropriate to transmit data which is for achieving a different object (for example, welding for repair) and which has a different type (for example, welding data).

(B) Use of Electromagnetic Step Motor as Actuator of Microrobot

Figure 8:
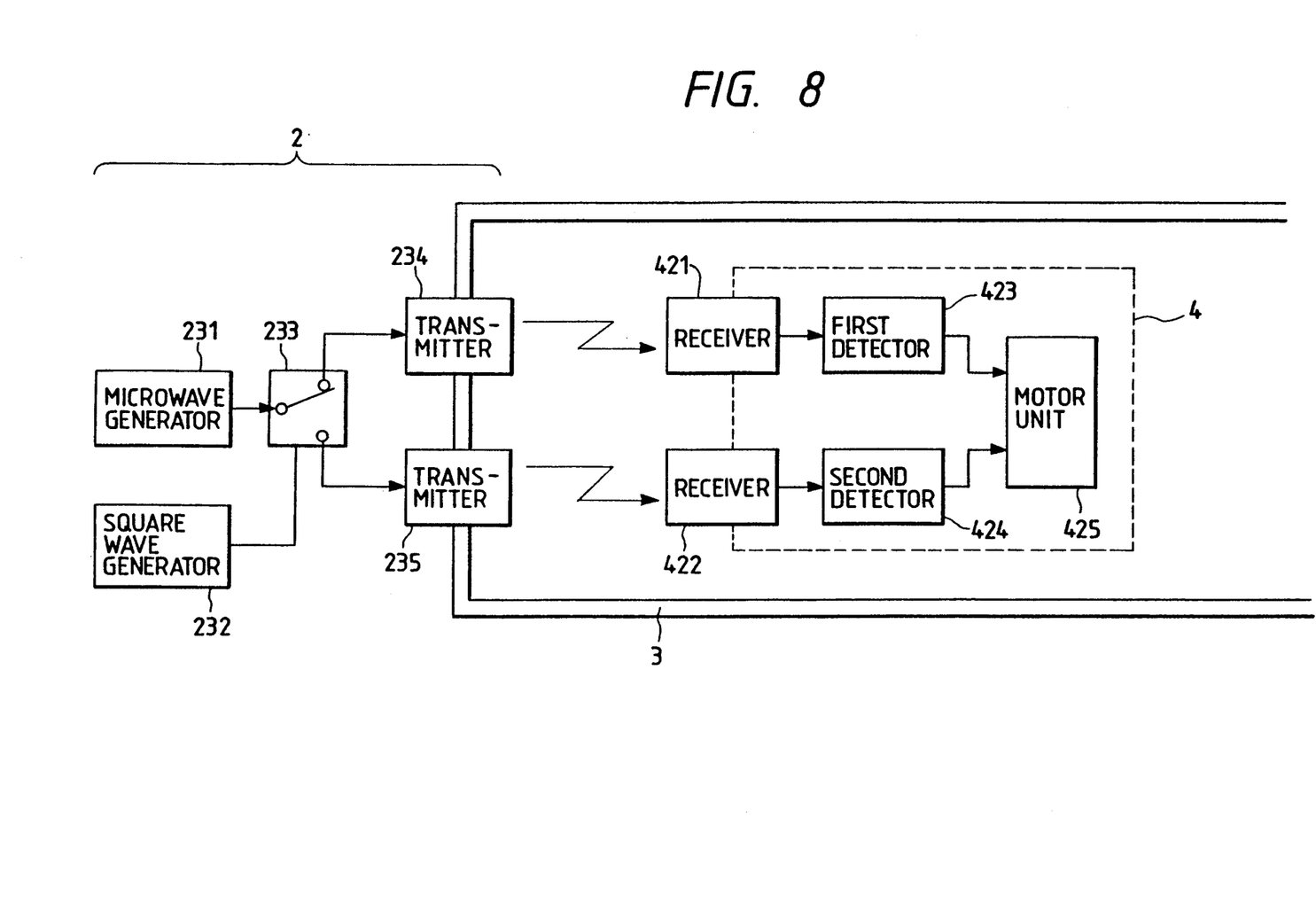
FIG. 8 shows different arrangements of a microwave transmitter and a microrobot in the second embodiment in the case of using a circular polarization microwave.
Figure 9:
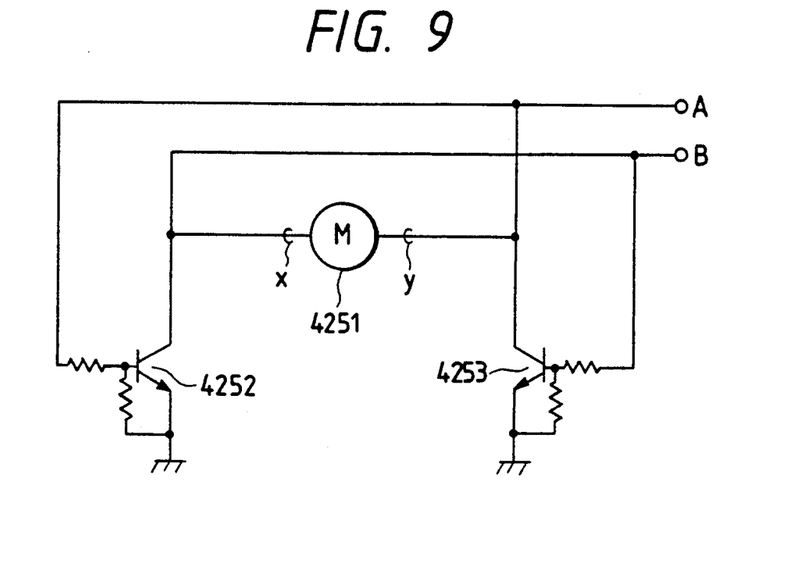
FIG. 9 is a circuit diagram showing an arrangement of a motor unit which acts as an actuator for driving a microrobot.

FIGS. 8 and 9 show arrangements of the microwave transmitter 2 and the microrobot 4. In FIG. 8, a microwave generator 231 outputs a microwave signal to generate a microwave for driving an electromagnetic step motor 4251 which will be described hereinafter, and a square wave generator 232 generates a rectangular wave signal for controlling the drive rotational speed of the electromagnetic step motor 4251. Further, a microwave switch 233 switches the output passage of the microwave from the microwave generator 231 to a right hand circular polarization transmitter 234 side or a left hand circular polarization transmitter 235 side. The right hand circular polarization transmitter 234 transmits a right hand circular polarization microwave in response to one intermittent output from the microwave switch 233 and the left hand circular polarization transmitter 235 transmits a left hand circular polarization microwave in response to the other intermittent output therefrom.

A right hand circular polarization receiver 421 receives the right hand circular polarization microwave to output a reception signal, and a first detector 423 detects the reception signal from the right hand circular polarization receiver 421 to convert it into a direct-current power. On the other hand, a left hand circular polarization receiver 422 also constituting the microrobot 4 receives the left hand circular polarization microwave to output a reception signal, and a second detector 424 detects the reception signal from the left hand circular polarization receiver 422 to convert it into a direct-current power. Further, a motor unit 425 comprises an electromagnetic step motor 4251, which operates in response to the direct-current powers from the first and second detectors 423 and 424, and a drive circuit. This motor unit 425 has an arrangement as illustrated in FIG. 9. That is, in FIG. 9, a terminal A is for receiving the direct-current power from the first detector 423, and a terminal B is for receiving the direct-current power from the second detector 424. The electromagnetic step motor 4251 has terminals x and y to which an alternating voltage is alternately applied so as to generate an alternating current (the current in the direction of x←y and the current in the direction of y←x). The electromagnetic step motor 4251 is rotationally driven by the alternating current. Further, there are provided first and second switch circuits 4252 and 4253 each of which comprises an NPN transistor and resistors. When a current is applied to the base of the NPN transistor, the collector and emitter of the NPN transistor are communicated with each other.

In operation, the microwave signal outputted from the microwave generator 231 is inputted to the microwave switch 233. At this time, due to the rectangular wave generator 232, the microwave signal is alternately outputted to the two output passages (the output passage to the right hand circular polarization transmitter 234 and the output passage to the left hand circular polarization transmitter 235). As a result, the microwaves from the right hand circular polarization transmitter 234 and the left hand circular polarization transmitter 235 are alternately transmitted to the inside of the piping system 3 with the polarizing direction varying. On the other hand, in the microrobot 4, the right hand circular polarization receiver 421 and the left hand circular polarization receiver 422 alternately receive the transmitted microwaves and outputs the respective reception signals to the first and second detectors 423 and 424 so as to alternately generate positive voltages.

As illustrated in FIG. 9, the positive voltages alternately outputted from the first and second detectors 423 and 424 are alternately applied to the terminals A and B. In the case that the voltage is applied to the terminal A (but not applied to the terminal B), a positive voltage is applied to the y terminal of the electromagnetic step motor 4251 and the first switch circuit takes the energization state through the operation of the NPN transistor, and hence the x terminal thereof is connected to the ground connection whereby a current flows through the electromagnetic step motor 4251 in the direction of x→y. On the other hand, in the case that the voltage is applied to the terminal B (but not applied to the terminal A), a positive voltage is applied to the x terminal of the electromagnetic step motor 4251 and the second switch circuit 4253 takes the energization state so that the x terminal thereof is grounded, whereby a current flows through the electromagnetic step motor 4251 in the direction of x→y.

According to this embodiment, with the right hand circular polarization microwave and the left hand circular polarization microwave being alternately and successively generated, an alternating current can be produced which is for driving the electromagnetic step motor 4251.

This means that a circuit for generating an alternating current is not required for a drive circuit for driving the electromagnetic step motor, and hence it is possible to perform the rotational drive and rotational speed control with an extremely small-sized and simple circuit arrangement. That is, this embodiment is extremely effective to the microrobot which is required to be constructed in microminiature.

Here, although the switch circuit is constructed with a NPN transistor, it is appropriate to use a switch having a different arrangement. Further, the above-described means for obtaining the alternating current is also effective to a different electric load (for example, an alternating-current motor, electrostatic motor and booster in welding) requiring the alternating current.

Figure 12:
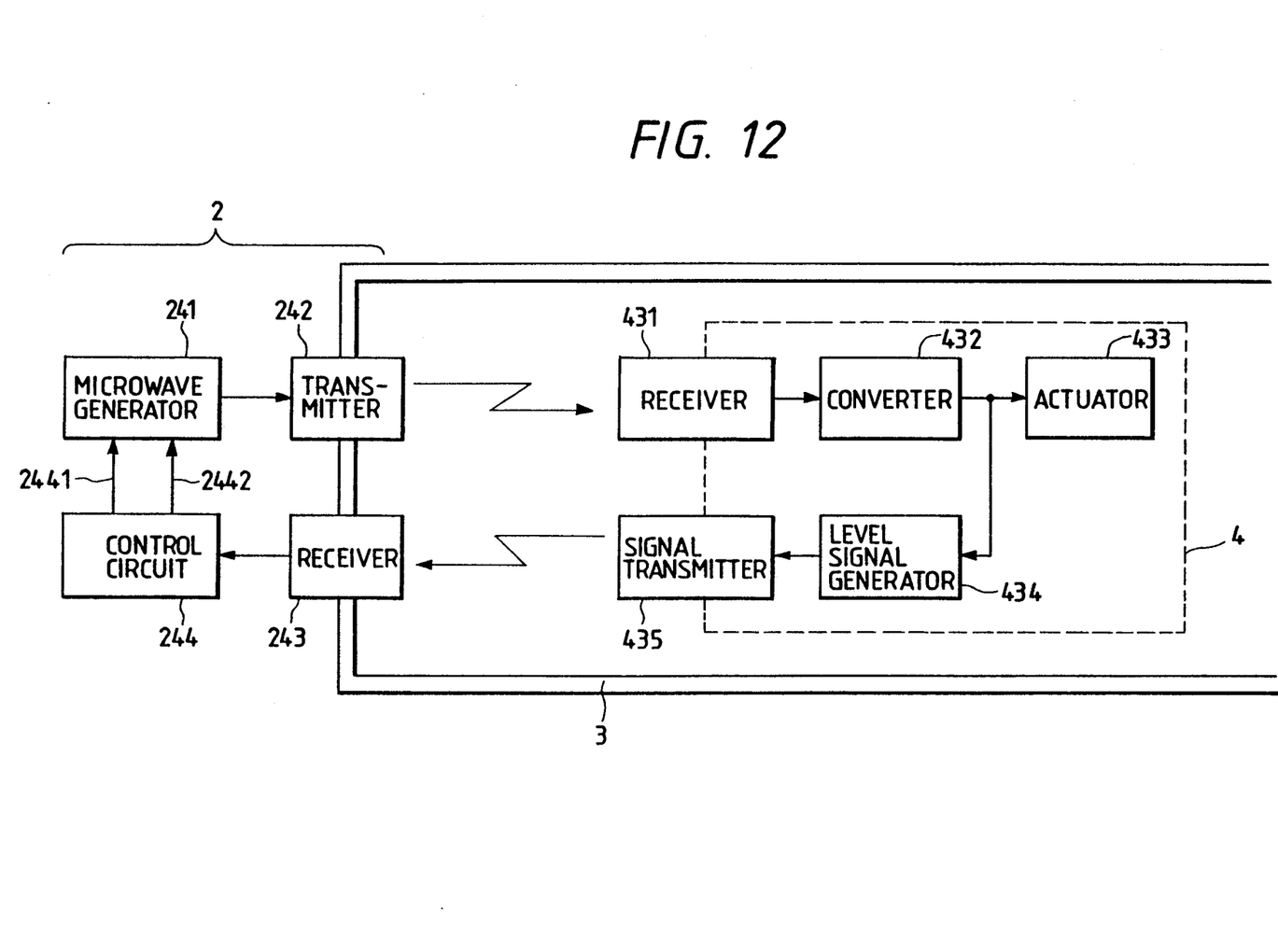
FIG. 12 is a block diagram showing arrangements of a microwave transmitter and a microrobot of an energy supply system according to a third embodiment of this invention.

In addition, a description will be made in terms of a third embodiment of this invention. This third embodiment relates to a system in which the transmission and reception of an electric wave are effected between a microwave transmitter 2 and a microrobot 4. FIG. 12 shows arrangements of the microwave transmitter 2 and the microrobot 4 according to the third embodiment of this invention. In FIG. 12, a microwave generator 241 outputs a microwave signal so as to generate a microwave which acts as drive energy for driving an actuator 433 of the microrobot 4. The power value and frequency of the microwave signal are changeable by means of a transmission control circuit 244, which will be described hereinafter. Further, a microwave transmitter 242 transmits a microwave into the piping system 3 in accordance with the microwave signal from the microwave generator 241. In the microrobot, a microwave receiver 431 constituting the microrobot 4 receives the transmitted microwave to output a reception signal to a converter 432. The converter 432 inputs and converts the reception signal from the microwave receiver 431 to obtain electric energy for driving the actuator 433. This electric energy is outputted to the actuator 433 (driving means) and further to a reception level signal generator 434. The microwave receiver 431 and the converter 432 correspond to a converting means.

The reception level signal generator 434 monitors the output level of the converter 432 and outputs a level signal corresponding to the output level thereof. An information signal generator 435 inputs this level signal therefrom so as to transmit into the piping system 3 an information electric wave modulated on the basis of the level signal. An information electric wave receiver 243 provided at an end portion of the piping system 3 receives the information electric wave from the microrobot 4 side to output it to the transmission control circuit 244. The transmission control circuit 244 detects a level signal from the information electric wave so as to control the power value and frequency of the microwave signal of the microwave generator 241 on the basis of the level value. In FIG. 12, numerals 2441 and 2442 are signal lines used for outputting first and second control signals to control the power value and frequency of the microwave of the microwave generator 241.

In operation, in FIG. 12, in response to the output of the microwave signal from the microwave generator 241, the microwave transmitter 242 transmits the microwave into the piping system 3. The transmitted microwave is received by the microwave receiver 431 of the microrobot 4 and converted into electric energy by the converter 432. This electric energy is supplied as drive energy to the actuator 433 and further outputted to the reception level signal generator 434. The reception level signal generator 434 monitors the output level of the converter 432 to output a level signal corresponding to the output level thereof, and the information signal transmitter 435 transmits into the piping system 3 the information electric wave modulated in accordance with the level signal. In response to the transmission of the information electric wave, the information electric wave receiver 243 disposed at an end portion of the piping system 3 receives the information electric wave and outputs it to the transmission control circuit 244. The transmission control circuit 244 detects a level signal from the information electric wave so as to control the power level and frequency of the microwave generator 241 through the signal lines 2441 and 2442 on the basis of the level value of the level signal.

With the above-described arrangement, the current microwave reception level of the microrobot is detectable whereby the control can adequately be effected in accordance with the reception level so as to appropriately operate the microrobot 4. That is, in the case that the reception level gradually decreases, a decision is made such that the microrobot 4 goes away from the microwave transmitter 242, and hence the transmission control circuit 244 outputs to the microwave generator 241 a control signal whereby the transmission power value is increased to correct the decrease in the reception level. The microwave transmitter 241 increases the electric power of the transmission microwave signal. Accordingly, it is possible to keep the stable operation even if the microrobot 4 goes away from the microwave transmitter 242. Moreover, in the case that the reception level rapidly decreases, a decision is made such that the inner diameter of the pipe in which the microrobot 4 operates varies in accordance with the movement of the microrobot 4, and hence the transmission control circuit 244 to output a control signal whereby the frequency value of the microwave from the microwave transmitter 242 varies. In response to the control signal, the microwave generator 241 changes the frequency of the microwave signal. Thus, it is possible to keep the stable operation of the microrobot 4 and further to set a frequency which allows the small-loss transmission into the pipe in which the microrobot 4 operates.

Here, for example, as the medium of the level signal there is used a portion of the microwave received by the microrobot 4 and modulated and returned. It is also appropriate to use a different medium such as an acoustic wave. In the case of using the portion of the microwave, circular polarizations whose turning directions are different from each other may be used in order to distinguish between the transmission microwave and the reception microwave to improve the isolation between the transmission and the reception to allow adequate communications.

Figure 10:
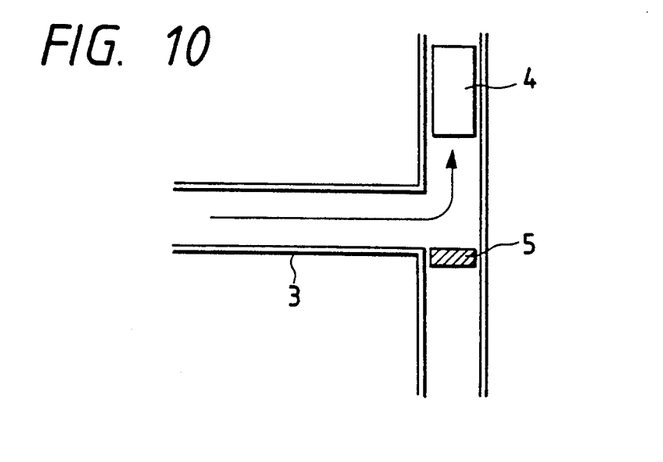
FIGS. 10 and 11 are illustrations for describing methods of transmitting a microwave at a small loss.

A description will be made hereinbelow in terms of methods which allow a small-loss transmission of the microwave in correspondence with the type of the pipe in the above-described first to third embodiments. A first method is that, in the case of a T-shaped piping as illustrated in FIG. 10, a reflecting plate 5 having a predetermined microwave reflection coefficient is provided in a pipe in which the microrobot 4 is not disposed. That is, in the case that the piping system 3 is branched, the power of the microwave is prevented from being distributed to make it difficult to supply sufficient energy to the microrobot 4. For example, by an operation of the microrobot 4, the reflecting plate 5 is provided in advance in the pipe of the branched piping to which the microrobot 4 does not advance, thereby preventing the introduction thereinto. Thus, as illustrated in FIG. 10, the microwave is propagated only in the direction indicated by an arrow, thereby effectively supplying the energy. Here, although the reflecting plate 5 is carried and disposed by the microrobot 4, it is also appropriate to use a different automatic-travelling type microrobot having a similar reflecting plate.

Figure 11:
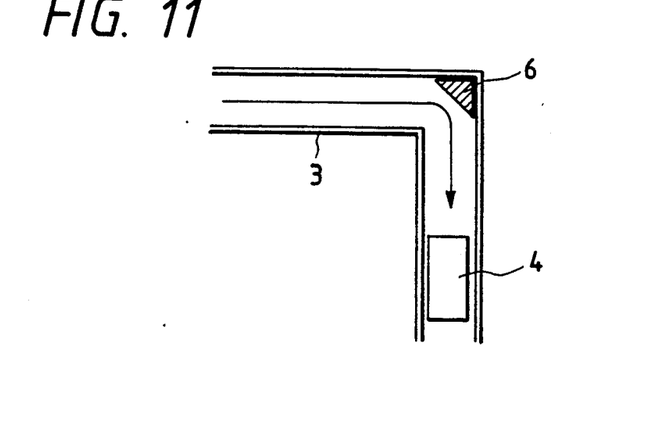

A second method is that, in the case of a L-shaped piping as illustrated in FIG. 11, a matching member 6 having a predetermined microwave reactance is provided at the bent portion. This is for preventing the transmitted microwave from being reflected due to the reactance component at the bent portion of L-shaped piping to make it difficult to supply the sufficient energy to the microrobot 4. The microrobot 4 caries and disposes the matching member 6 up to and at a predetermined position of the bent portion. This matching member 6 removes the reactance component to prevent the reflection at the bent portion. Thus, as illustrated in FIG. 11, the microwave can be transmitted in the direction indicated by an arrow to ensure the effective transmission of the microwave. Although the matching member 6 is carried and disposed by the microrobot 4, it is also appropriate to use a different automatic-travelling type of microrobot.

Figure 13:
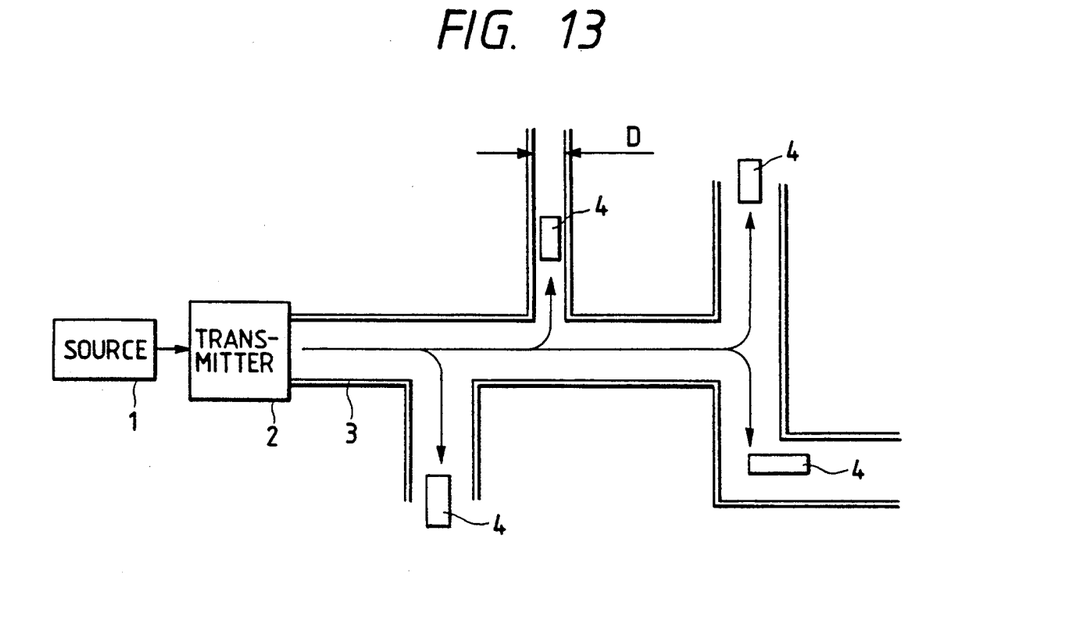
FIG. 13 shows another entire arrangement of this invention.

Although in the above description of the embodiments one microrobot moves and operates in a piping system in which a plurality of pipes having different inner diameters are connected to each other, it is appropriate to use one microrobot with respect to each of the pipes of the piping system as illustrated in FIG. 13. In this case, the operation of the microrobot is required to be controlled as described in the second embodiment. The actuator of the microrobot which is not required to operate is stopped by means of the data transmission and only the microrobot which is required to operate moves. Thus, it is possible to effectively move the microrobot having the reflecting plate 5 or the matching member 6 to a predetermined position.

According to this invention, since the energy supply can be effected from the transmission means to the robot without using the electric connection, it is possible to smoothly move the robot even if an extremely small robot operates within a pipe with an extremely small inner diameter. In addition, since the electric wave to be transmitted from the transmission means can be propagated to the robot at a small loss, it is possible to lengthen the transmission distance of the electric wave and hence to surely operate the robot, even if the transmission means is separated from the robot.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A system for supplying energy into a piping system made of a conductive material, comprising:
a robot adapted to operate within said piping system;
transmission means for transmitting microwaves into said piping system, said microwaves being in a transmission mode having a uniform electromagnetic energy distribution within a surface perpendicular to an axis of a pipe of said piping system and in a circumferential direction, and being of a frequency higher than a cut-off frequency determined by an inner diameter of said pipe;

converting means provided in said robot for receiving said microwaves and for converting the received microwaves into an electric power; and driving means provided in said robot for driving said robot by said electric power.

2. A system as claimed in claim 1, wherein microwaves to be transmitted by said transmission means are in TE$_{11}$ mode wherein wave numbers in both circumferential and axial directions are 1 (one).

3. A system as claimed in claim 2, wherein said microwaves are circularly polarized.

4. A system as claimed in claim 3, wherein said microwaves are right hand and left hand circularly polarized.

5. A system as claimed in claim 1, further comprising:
means provided in said robot for detecting a level of said microwaves received by said converting means;
means provided in said robot for transferring a level value of said level; and
means for changing at least one of an electric power level and a frequency of said microwaves from said transmission means in accordance with said level value from said level value transferring means.

6. A system as claimed in claim 1, wherein said microwaves are transmitted by said transmitting means in at least one of a TEox mode and a TMox mode within said piping system, and wherein a wave number in said circumferential direction is zero.

7. A system as claimed in claim 1, wherein said transmission means comprises an antenna having a flat loop oriented in a plane parallel to a line tangential to said pipe.

8. A system for supplying energy into a piping system made of a conductive material, comprising:
a robot adapted to operate within said piping system;
transmission means for transmitting microwaves into said piping system, said microwaves being in a transmission mode having a uniform electromagnetic energy distribution within a surface perpendicular to an axis of a pipe of said piping system and in a circumferential direction, being of a frequency higher than a cut-off frequency determined by an inner diameter of said pipe, and having right hand and left hand circular polarizations;
converting means provided in said robot for receiving said microwaves, for converting one of said right hand and left hand circular polarizations into an electric power, and for converting the other of said right hand and left hand circular polarizations into information; and
driving means provided in said robot for driving said robot by said electric power according to said information.

9. A system for supplying energy into a piping system made of a conductive material, comprising:
a robot adapted to operate within said piping system;
transmission means for transmitting microwaves into said piping system, said microwaves being in a transmission mode having a uniform electromagnetic energy distribution within a surface perpendicular to an axis of a pipe of said piping system and in a circumferential direction, and being of a frequency higher than a cut-off frequency determined by an inner diameter of said pipe, said transmission means alternately transmitting said right hand and left hand circular polarizations of said microwaves;

converting means provided in said robot for receiving said microwaves right and left hand polarizations and for converting said received microwaves into an electric power having an alternating current;
driving means provided in said robot for driving said robot by said electric power.

10. A system as claimed in claim 9, wherein said driving means comprises an electromagnetic step motor and a first and a second transistor means, said first and said second transistor means being connected respectively to a first and a second terminal of said electromagnetic step motor and respectively responsive to voltages due to said right hand and left hand circular polarizations so that said alternating current is applied to said electromagnetic step motor.

11. A system for supplying energy into a piping system made of a conductive material and having pipes branched from each other, comprising:
a robot adapted to operate within said piping system;
transmission means for transmitting microwaves into said piping system, said microwaves being in a transmission mode of a uniform electromagnetic energy distribution within a surface perpendicular to an axis of a pipe of said piping system and in a circumferential direction, and being of a frequency higher than a cut-off frequency determined by an inner diameter of said pipe;
converting means provided in said robot for receiving said microwaves and for converting the received microwaves into an electric power;
driving means provided in said robot for driving said robot by said electric power; and
a member, satisfying a short condition of said microwaves, disposed in a branched pipe wherein there is no robot.

12. A system for supplying energy into a piping system made of a conductive material and having a bent portion, comprising:
a robot adapted to operate within said piping system;
transmission means for transmitting microwaves into said piping system, said microwaves being in a transmission mode having a uniform electromagnetic energy distribution within a surface perpendicular to an axis of a pipe of said piping system and in a circumferential direction, and being of a frequency higher than a cut-off frequency determined by an inner diameter of said pipe;
converting means provided in said robot for receiving said microwaves and for converting the received microwaves into an electric power;
driving means provided in said robot for driving said robot by said electric power; and
a member disposed in said bent portion for removing a reactance component created by said bent portion.

13. A system for supplying energy into a piping system made of a conductive material, comprising:
a robot adapted to operate within said piping system;
transmission means for transmitting microwaves into said piping system, comprising:
an electric power distribution means for inputting microwaves and outputting two microwave currents;
a first loop conductor; and
a second loop conductor, said first and said second loop conductors respectively responsive to said two microwave currents and shifted by a predetermined angle from each other in a circumferential direction of a pipe of said piping system so that said microwaves become circularly polarized; said microwaves being in a transmission mode having a uniform electromagnetic energy distribution within a surface perpendicular to an axis of a pipe of said piping system and in a circumferential direction, and being of a frequency higher than a cut-off frequency determined by an inner diameter of said pipe;

converting means provided in said robot for receiving said microwaves and for converting the received microwaves into an electric power; and driving means provided in said robot for driving said robot by said electric power.

* * * * *